(12) United States Patent
Sompalli et al.

(10) Patent No.: US 7,816,058 B2
(45) Date of Patent: *Oct. 19, 2010

(54) SPLIT ARCHITECTURES FOR MEA DURABILITY

(75) Inventors: Bhaskar Sompalli, Rochester, NY (US); Susan G Yan, Fairport, NY (US); Anthony B LaConti, Lynnfield, MA (US); Brian A Litteer, Henrietta, NY (US)

(73) Assignee: GM Global Technology Operations, Inc.

( * ) Notice: Subject to any disclaimer, the term of this patent is extended or adjusted under 35 U.S.C. 154(b) by 1717 days.

This patent is subject to a terminal disclaimer.

(21) Appl. No.: 10/981,867

(22) Filed: Nov. 5, 2004

(65) Prior Publication Data

US 2006/0099486 A1 May 11, 2006

(51) Int. Cl.
*H01M 4/00* (2006.01)
*H01M 8/10* (2006.01)

(52) U.S. Cl. .............. 429/523; 429/482; 429/483; 429/484

(58) Field of Classification Search .............. None
See application file for complete search history.

(56) References Cited

U.S. PATENT DOCUMENTS

| | | | |
|---|---|---|---|
| 3,134,697 A | 5/1964 | Niedrach | |
| 5,272,017 A | 12/1993 | Swathirajan et al. | |
| 5,464,700 A | 11/1995 | Steck et al. | |
| 6,020,083 A | 2/2000 | Breault et al. | |
| 6,057,054 A * | 5/2000 | Barton et al. | 429/42 |
| 6,099,984 A | 8/2000 | Rock | |
| 6,127,058 A | 10/2000 | Pratt et al. | |
| 6,350,538 B1 | 2/2002 | Wilkinson et al. | |
| 6,391,486 B1 * | 5/2002 | Narayanan et al. | 429/40 |
| 6,399,231 B1 * | 6/2002 | Donahue et al. | 429/13 |
| 6,723,464 B2 * | 4/2004 | Tabata et al. | 429/43 |
| 6,861,173 B2 * | 3/2005 | Bhaskar et al. | 429/40 |
| 2003/0190518 A1 * | 10/2003 | Karuppaiah et al. | 429/44 |
| 2004/0067407 A1 * | 4/2004 | Sompalli et al. | 429/40 |
| 2004/0091767 A1 * | 5/2004 | Zuber et al. | 429/40 |
| 2005/0058881 A1 * | 3/2005 | Goebel et al. | 429/40 |

FOREIGN PATENT DOCUMENTS

| | | |
|---|---|---|
| DE | 19983846 T | 3/2002 |
| DE | 10050467 | 5/2002 |
| DE | 101 59 476 | 7/2003 |
| DE | 10196645 | 8/2003 |
| DE | 10303655 | 8/2003 |
| WO | WO 00/10216 | 2/2000 |

* cited by examiner

*Primary Examiner*—Dah-Wei D Yuan
*Assistant Examiner*—Kwang Han
(74) *Attorney, Agent, or Firm*—Harness, Dickey & Pierce, P.L.C.

(57) ABSTRACT

A membrane electrode assembly including an ionically conductive member, an electrode, and an electrically conductive member including an active layer, wherein the electrode is a smooth, continuous layer that completely covers and supports the ionically conductive member. The electrode and active layer further include a first and second catalyst content, respectively; and 50% of the total catalyst content is present in the electrode and 50% of the total catalyst content is present in the active layer.

12 Claims, 4 Drawing Sheets

US 7,816,058 B2

SPLIT ARCHITECTURES FOR MEA DURABILITY

FIELD OF THE INVENTION

The present invention relates to fuel cells and, more particularly, to membrane electrode assemblies for a fuel cell.

BACKGROUND OF THE INVENTION

Fuel cells have been proposed as a power source for electric vehicles and other applications. One such fuel cell is the PEM (i.e. Proton Exchange Membrane) fuel cell that includes a so-called "membrane-electrode-assembly" (MEA) comprising a thin, solid polymer membrane-electrolyte having a pair of electrodes (i.e., an anode and a cathode) on opposite faces of the membrane-electrolyte. The MEA is sandwiched between planar gas distribution elements.

The electrodes are typically of a smaller surface area as compared to the membrane electrolyte such that edges of the membrane electrolyte protrude outward from the electrodes. On these edges of the membrane electrolyte, gaskets or seals are disposed to peripherally frame the electrodes. Due to the limitations of manufacturing tolerances, the seals, MEA, and gas distribution elements are not adequately closely aligned which may result in tears and pinholes in the sensitive membrane electrolyte. This in turn reduces the life of the membrane electrolyte Further, due to the limitations of manufacturing tolerances, a flux of reactants can cross the solid polymer electrolyte from one electrode to the other electrode.

SUMMARY OF THE INVENTION

With the above drawbacks in mind, the present invention provides a membrane electrode assembly including an ionically conductive member, an electrode, and an electrically conductive member including an active layer, wherein the electrode is essentially a smooth, continuous layer that completely covers and supports the ionically conductive member. The electrode and active layer further include a first and second catalyst content, respectively; and 50% of the total catalyst content is present in the electrode and 50% of the total catalyst content is present in the active layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
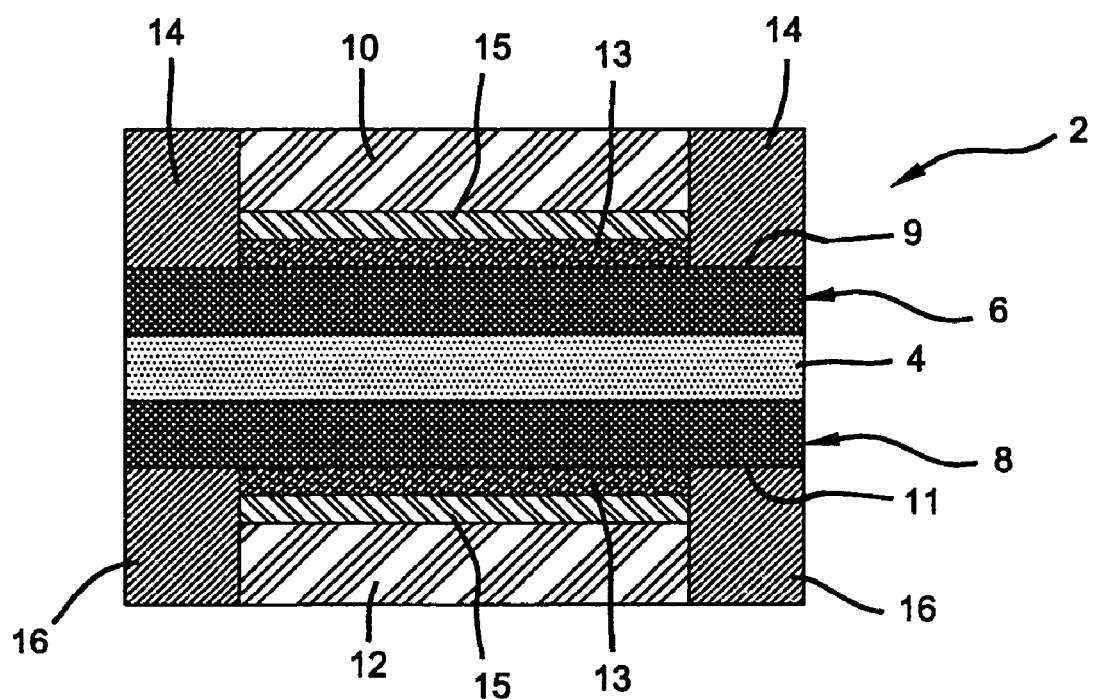
FIG. 1 is a cross-sectional view of a membrane electrode assembly according to a first embodiment of the present invention.

FIG. 1 is a cross-sectional view of a membrane electrode assembly (MEA) according to the present invention. As shown in FIG. 1, the MEA 2 includes an ionically conductive member 4 sandwiched by an anode electrode 6 and a cathode electrode 8 that provide a pair of active surfaces 9 and 11. The MEA 2 is further sandwiched by a pair of electrically conductive members 10 and 12, or gas diffusion media 10 and 12. The gas diffusion media 10 and 12 each include an active layer 13 that is adjacent to the active surfaces 9 and 11 of the MEA 2 and are peripherally surrounded by frame-shaped gaskets 14 and 16. Gaskets 14 and 16 and the catalyst-coated diffusion media 10 and 12 may or may not be laminated to the ionically conductive member 4 and/or the electrodes 6 and 8.

The ionically conductive member 4 is preferably a solid polymer membrane electrolyte, and preferably a PEM. Member 4 is also referred to herein as a membrane 4. Preferably, the ionically conductive member 4 has a thickness in the range of about 10 μm-100 μm, and most preferably a thickness of about 25 μm. Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 4 may comprise any of the proton conductive polymers conventionally used in the art. Preferably, perfluorinated sulfonic acid polymers such as NAFION® are used. Furthermore, the polymer may be the sole constituent of the membrane, contain mechanically supporting fibrils of another material, or be interspersed with particles (e.g., with silica, zeolites, or other similar particles). Alternatively, the polymer or ionomer may be carried in the pores of another material.

The ionically conductive member 4 is a cation permeable, proton conductive membrane, having $H^+$ ions as the mobile ion; the fuel gas is hydrogen (or reformate) and the oxidant is oxygen or air. The overall cell reaction is the electrochemical conversion of hydrogen and oxygen to water and the respective reactions at the anode and cathode are $H_2=2H^++2e^-$ (anode) and $\frac{1}{2}O_2+2H^++2e^-=H_2O$ (cathode).

The composition of the anode electrode 6 and cathode electrode 8 preferably comprises electrochemically active material dispersed in a polymer binder which, like the ionically conductive member 4, is a proton conductive material such as NAFION®. The electrochemically active material preferably comprises catalyst-coated carbon or graphite particles. The anode electrode 6 and cathode electrode 8 will preferably include platinum-ruthenium, platinum, or other Pt/transition-metal-alloys as the catalyst. Although the anode 6 and cathode 8 in the figures are shown to be equal in size, it should be noted that it is not out of the scope of the invention for the anode 6 and cathode 8 to be of different size (i.e., the cathode larger than the anode or vice versa). A preferred thickness of the anode and cathode is in the range of about 2-30 μm, and most preferably about 10 μm.

The gas diffusion media 10 and 12 may be any gas diffusion media known in the art. Preferably, the gas diffusion media 10 and 12 are carbon papers, carbon cloths, or carbon foams with a thickness in the range of about 50-300 μm. These may be impregnated with various levels of Teflon® or other fluorocarbons to achieve more or less hydrophobicity. In accordance with the present invention, and as stated above, the gas diffusion media 10 and 12 also include active layers 13 that are disposed adjacent the active surfaces 9 and 11 of the MEA 2. The active layers 13 are composed of electrochemically active material dispersed in a polymer binder which, like the anode and cathode electrodes 6 and 8, is a proton conductive material such as NAFION®. The electrochemically active material preferably comprises catalyst-coated carbon or graphite particles. The active layers 13 preferably include platinum-ruthenium, platinum, or other Pt/transition-metal-alloys as the catalyst.

Moreover, although not required by the present invention, it is preferable to include an intermediate layer 15 that is disposed between the active layer 13 and the gas diffusion medium 10 or 12. This intermediate layer 15, which is a microporous layer 15, is preferably composed of carbon or graphite particles dispersed in a Teflon® binder. This intermediate layer 15 is a water management layer that wicks water produced from the electrochemical reaction of the fuel cell away from the anode and cathode electrodes 6 and 8. Further, the intermediate layer 15 prevents the catalyst and ionomer of the active layer 13 and electrodes 6 and 8 from leaking into the diffusion media 10 and 12. Preferably, the intermediate layer is 5-25 μm in thickness, and most preferably 10-15 μm in thickness.

The gaskets 14 and 16 are typically elastomeric in nature but may also comprise materials such as polyester and PTFE. However, the gaskets 14 and 16 may be any material sufficient for sealing the membrane electrode assembly 2. A preferred thickness of the gaskets 14 and 16 is approximately ½ the thickness of the gas diffusion media 10 and 12 to about 1½ times the thickness of the gas diffusion media 10 and 12.

The electrodes 6 and 8 and the active layers 13 preferably include a total catalyst loading in the range of 0.05-0.4 mg/cm². The most preferable total catalyst loading is 0.4 mg/cm². Preferably, 25-100% of the total loading is in the electrode 6 and 8, and 0-75% is in the active layer 13. More preferably, 40-80% of the total loading is in the electrode 6 and 8, and 20-60% is in the active layer 13. Most preferably, 50% of the total loading is in the electrode 6 and 8, 50% is in the active layer 13. As such, in the most preferable embodiment, a loading of the electrodes 6 and 8 is preferably 0.2 mg/cm² and a loading of the active layer 13 is also 0.2 mg/cm². It should be understood, however, that the above described catalyst loadings of the electrodes 6 and 8 and active layer 13 should not be limited to the above percentages, and a loading split between the electrodes 6 and 8 and active layer 13 in any percentage is contemplated.

Figure 2:
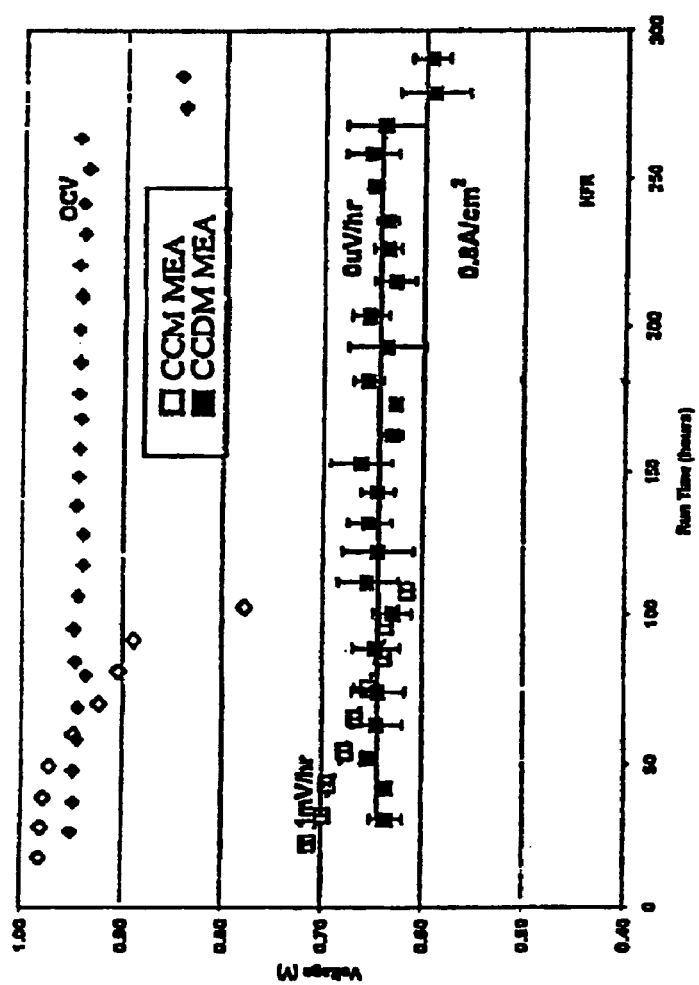
FIG. 2 is a graph comparing the durability lifetimes and fluoride elution in water between a standard catalyst coated membrane electrode assembly and a standard catalyst coated diffusion media assembly.

The advantage of the above structure is that a catalyst-coated diffusion medium 10 and 12 has a very low degradation in the harsh fuel cell environment. The degradation of fuel cell performance can be monitored by calculating fluoride elution in the water produced as a result of the electrochemical reaction of the fuel cell. FIG. 2 is a graph depicting a comparison of the amount of fluoride elution between a standard catalyst-coated membrane assembly and a catalyst-coated diffusion media assembly. Each assembly was tested under partially dry conditions at 95° C. and 300 kPa. As shown in FIG. 2, the standard catalyst-coated membrane assembly experienced a fluoride loss of $7 \times 10^{-7}$ g/cm²/hr, and merely lasted approximately 65 hours before developing severe failures along the catalyst layer edges. In contrast, the catalyst-coated diffusion medium assembly merely experienced a fluoride loss of $5 \times 10^{-9}$ g/cm²/hr, and lasted approximately 350 hours. The failure occurred when the membrane 4 tore along the edges of the diffusion media 10 and 12 due to the fibers of the diffusion media 10 and 12 puncturing the membrane 4.

As such, by employing a split architecture that includes an active layer 13 coated onto the diffusion media 10 and 12 as well as an electrode 6 or 8, with the total catalyst loading split between each region, overall cell performance is enhanced. This is because the split architecture of the MEA 2 provides both the advantage of the low degradation afforded by a catalyst coated diffusion media 10 and 12 with the advantage of a double-layer to protect the membrane 4 from puncture.

Further, by utilizing electrodes 6 and 8 that completely cover the ionically conductive member 4 in conjunction with the catalyst-coated diffusion media 10 and 12, mechanical support throughout the entire surface of the ionically conductive member 4 is achieved. That is, the ionically conductive member 4 is protected from the high pressures needed to compress the fuel cell assembly to ensure sufficient electrical conductivity between its components. This in turn reduces the possibility that the membrane 4 will creep and rupture.

Still further, it should be understood that the anode electrode 6 and cathode electrode 8 are disposed over the ionically conductive member 4 as continuous, smooth layers which provides an essentially flat surface for the other elements of the MEA 2 to rest upon. This is beneficial in that when elements such as the diffusion media 10 and 12 and gaskets 14 and 16 are compressed along with the MEA 2 in a fuel cell to facilitate and enhance the electrical conductivity of the electrons produced in the electrochemical reaction of the fuel cell, the ionically conductive member 4 will be subjected to uniform pressure throughout its surface. When the ionically conductive member 4 is subjected to uniform pressures throughout its surface, undue stress on the ionically conductive member 4 will be eliminated. As such, the tears and pinholes that may develop and shorten the life of the MEA 2 and inhibit the overall cell potential will also be eliminated.

Although catalyzed carbon or graphite particles dispersed in a proton conductive binder such as NAFION® has been described and is preferable, it is not out of the scope of the present invention to substitute different materials in place of the carbon or graphite particles and proton conductive binder. For example, electrically conductive oxides, carbides, and nitrides and particularly electrically conductive metal oxides, carbides, and nitrides may be used. More specifically, particulate matter such as silicon carbide, titanium dioxide, silicon dioxide, any other ceramics, or any other material that has a sufficient thermal conductivity, preferably equal to or greater than carbon, may be used in place of the carbon or graphite particles. It is also preferable that this particulate matter have a particle size equal to or less than 15 μm, be chemically stable in the fuel cell environment, and have a sufficient thermal conductivity, preferably equal or greater than carbon or graphite particles.

An example of a binder that may be used in place of the proton conductive binder is polybenzimidazole (PBI). Other binders may be suitable as long as they maintain good adhesion with the ionomeric membrane, are chemically stable in the fuel cell environment, thermally stable up to 150° C. and preferably up to 200° C., are preferably castable from solutions, and maintain good retention of their mechanical properties after the casted films endure temperature excursions up to 150° C. More specifically, the anode electrode 6 and cathode electrode 8 should comprise materials that supply approximately the same tensile strength, non-standard modulus, elongation to break, specific gravity, water uptake, and linear expansion.

Figure 3A:
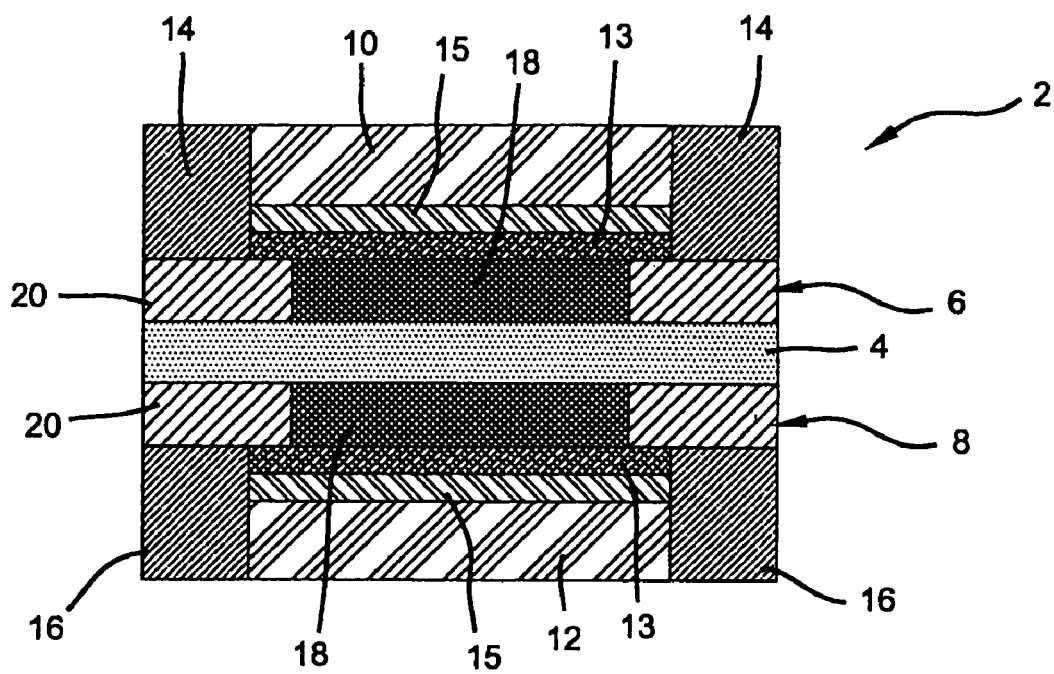
FIGS. 3A and 3B are a cross-sectional views of a membrane electrode assembly according to a second embodiment of the present invention.

Now, a second embodiment of the present invention will be described. Referring to FIG. 3A, the anode electrode 6 and cathode electrode 8 each comprise a central region 18 and a peripheral region 20. The central region 18 comprises a first catalyst content and the peripheral region 20, which frames the central region 18, comprises a second catalyst content, wherein the first catalyst content is greater than the second catalyst content. Specifically, it is preferable that the central region 18 of the anode 6 and cathode 8 comprise a catalyst loading in the range of about 0.05-0.2 mg/cm$^2$ of the catalytically active phase (e.g., Pt). It is particularly preferable that the central region 18 comprise a catalyst loading of about 0.2 mg/cm$^2$ of the catalytically active phase (e.g., Pt). The peripheral region 20 preferably comprises a catalyst loading less than the above described ranges, and more preferably comprises a zero catalyst loading (e.g., Pt).

There is no limitation to how the central and peripheral regions 18 and 20 are disposed to protect the ionically conductive member 4 and subject the member 4 to uniform mechanical properties. In FIG. 3A, the anode electrode 6 and cathode electrode 8 including the central region 18 and peripheral region 20 are coated on the ionically conductive member 4 to completely cover the ionically conductive member 4. As such, the diffusion media 10 and 12 including the active layers 13 rest upon the anode electrode 6 and the cathode electrode 8. Gaskets 14 and 16 frame the diffusion media 10 and 12 and also rest upon anode electrode 6 and cathode electrode 8 to seal the assembly 2. The gaskets 14 and 16 and the catalyst-coated diffusion media 10 and 12 may or may not be laminated to the anode electrode 6 and cathode electrode 8.

Figure 3B:
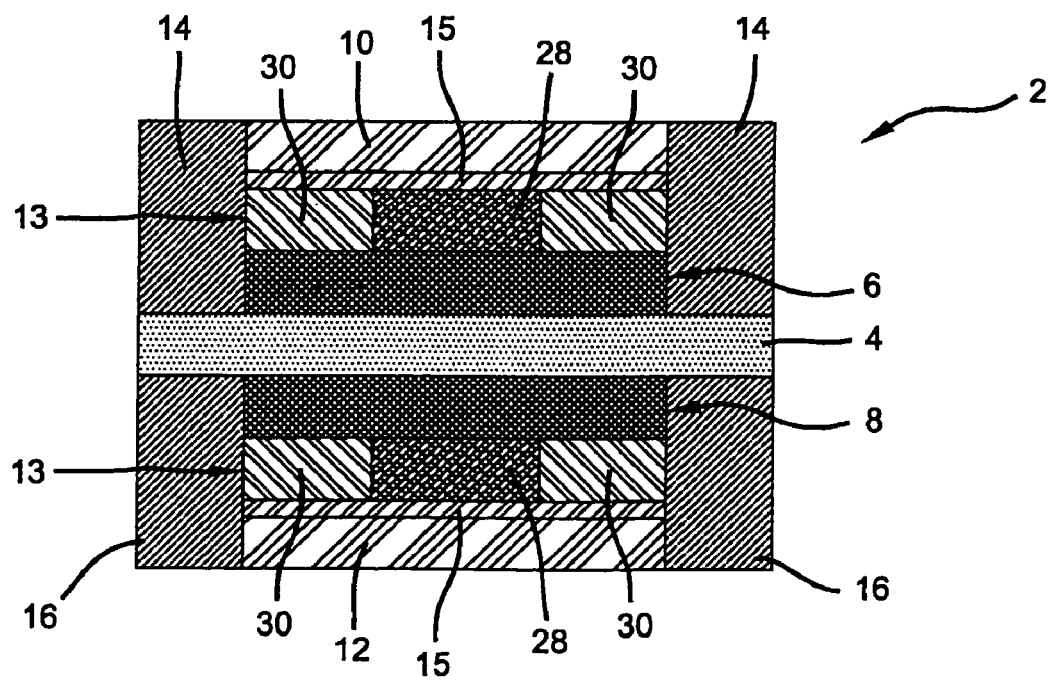

In contrast, as shown in FIG. 3B, the active layers 13 of the diffusion media 10 and 12 may include the central and peripheral regions 28 and 30. Gaskets 14 and 16 are now disposed to contact the ionically conductive member 4. The active layers 13 including the central and peripheral regions 28 and 30 may or may not be laminated to the anode and cathode electrodes 4 and 6. Furthermore, the gaskets 14 and 16 may or may not be laminated to the diffusion media 10 and 12.

It should be understood that a definitive border between the central region 18, 28 and peripheral region 20, 30 does not necessarily exist as shown in FIGS. 3A and 3B. More particularly, it should be understood that essentially a gradient exists between the central region 18, 28 and the peripheral region 20, 30 such that the content of catalyst gradually moves from a greater content in the central region 18, 28 to lesser content in the peripheral region 20, 30. This gradient will exist over the course of, for example, 1 mm. Further, the anode electrode 6, cathode electrode 8, and active layers 13 of the diffusion media 10 and 12 should each exist as a smooth, continuous layer so that the ionically conductive member 4 experiences essentially uniform mechanical properties throughout its entire surface which will protect the ionically conductive member 4 from stress, over-compression, and puncture.

Employing a configuration wherein the central region 18, 28 has a catalyst content greater than a catalyst content of the peripheral region 20, 30 also provides an advantage in that the expensive catalyst, which preferably comprises metal catalysts such as platinum, palladium, titanium, ruthenium, rhodium, tungsten, tin, or molybdenum, will not be used in areas where the (electro-) chemical reaction is inhibited or not desired. Such an area is located at the edges of the electrically conductive gas diffusion media 10 and 12.

Another advantage of a design where the catalyst content in the peripheral region 20, 30 is less than the central region 18, 28 is that the generation of heat is suppressed. The electrochemical reaction of hydrogen and oxygen in the fuel cell produces, in addition to water, heat. In a fuel cell, the heat generated by the electrochemical reaction (or by chemical reaction due to either gas permeation through the membrane 4 or gas cross-over through pinholes in the membrane 4) is transferred away by the porous gas diffusion media 10 and 12. In the present invention, however, the anode and cathode electrodes 6 and 8 extend outward from the gas diffusion media 10 and 12 in order to protect the delicate ionically conductive member 4 from stress and puncture. Although electrochemical reaction rates are largely diminished in regions outside of the diffusion media 10 and 12 (due to poor electronic in-plane conduction in the electrodes 6 and 8), heat is still generated due to the catalyst still being present and exposed to the gaseous reactants. As the gaseous reactants have access to the catalyst, the electrochemical reaction of the fuel cell still progresses in the peripheral region 20, 30 that produces heat; particularly in the case of small membrane pinholes, permeation of either reactant ($H_2$ or $O_2$) will lead to a chemical reaction producing heat. As such, reducing the catalyst content over a gradient between the central region 18, 28 and the peripheral region 20, 30 preferably down to zero, will reduce and suppress the amount of heat generated.

In the second embodiment comprising the central region 18, 28 and the peripheral region 20, 30, it should be noted that different materials may be used for the central region 18, 28 and the peripheral region 20, 30 as long as the mechanical properties of each region are essentially the same so that a discontinuity in properties is not experienced along the surfaces of the ionically conductive member 4. For example, the central region 18, 28 and peripheral region 20, 30 may comprise different catalyst coated electrically conductive support particles such as carbon, graphite, or electrically conductive oxides, carbides, and nitrides, particularly electrically conductive metal oxides, carbides, and nitrides. Furthermore, relatively non-electrically conductive particulate matter such as silicon carbide, titanium dioxide, silicon dioxide, any other ceramics, or any other material that has a sufficient thermal conductivity, preferably equal to or greater than carbon, may be used in place of the carbon or graphite particles.

In addition to reducing the amount of expensive catalyst utilized and the amount of heat produced, the production of hydrogen peroxide ($H_2O_2$) can be suppressed and eliminated in the second embodiment. That is, during the normal operation of a fuel cell, hydrogen and oxygen gas permeate across the ionically conductive member 4 to both cathode 8 and anode 6, respectively, such that oxygen is in the presence of the hydrogen fuel. When these reactant gases comes into contact with the electrochemically active material of the electrodes, the oxygen is reduced and reacts with $H^+$ ions produced from the oxidation of the hydrogen fuel gas. This ensuing side reaction between the reduced oxygen and $H^+$ ions produces $H_2O_2$ as follows:

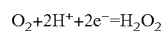

$$O_2 + 2H^+ + 2e^- = H_2O_2$$

Figure 4:
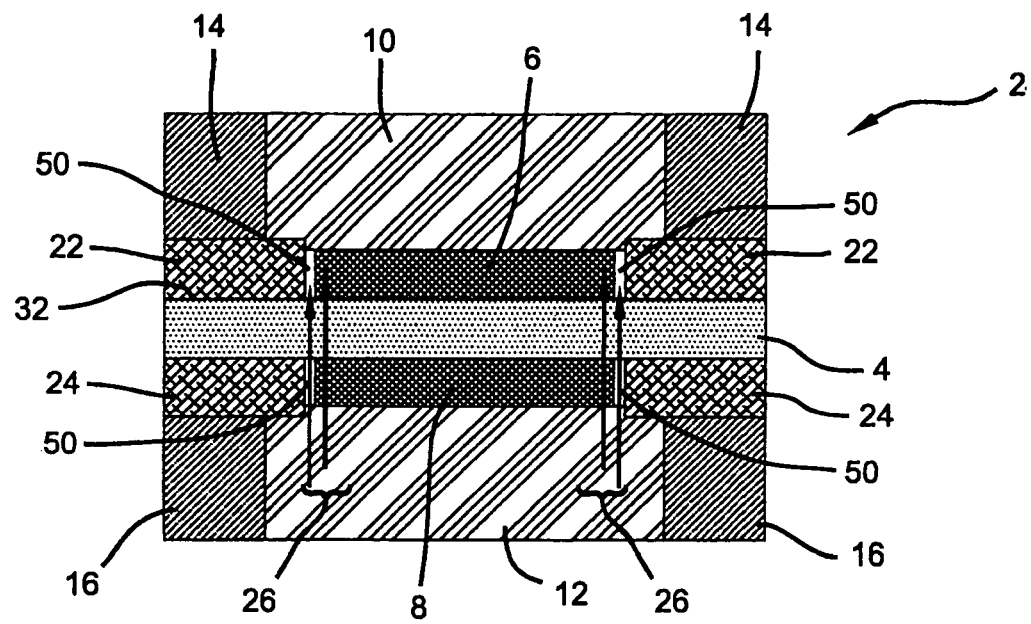
FIG. 4 is a prior art membrane electrode assembly.

This production of $H_2O_2$ has been known to cause a degradation of the membrane 4 and, thus, a diminished fuel cell life and performance. Referring to FIG. 4, a prior art membrane electrode assembly 2 is depicted. As shown in FIG. 4, a prior art membrane electrode assembly includes sub-gaskets 22 and 24 disposed between the membrane 4 and beneath the gaskets 14 and 16. Due to manufacturing tolerances of the gaskets 14 and 16, and sub-gaskets 22 and 24, the fuel cell gases are more prone to permeate the membrane 4 at the edges of the membrane 4 at so-called gaps 50 between the elements of the fuel cell caused by these manufacturing tolerances. As such, a condensed flux 26 of the reactant gases is able to collect at the edges of the electrodes.

Figure 5:
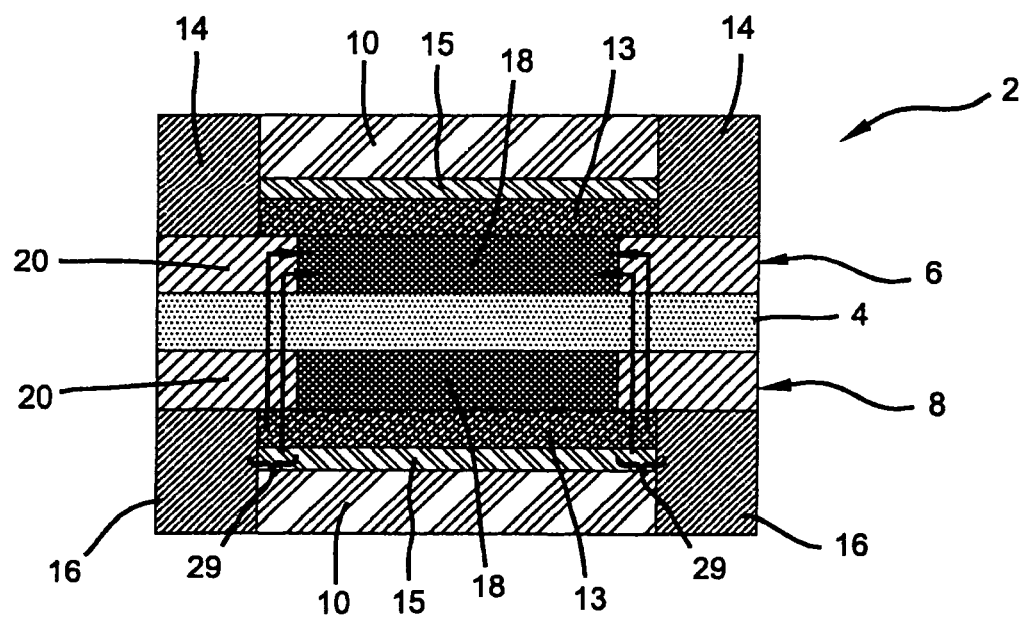
FIG. 5 is a membrane electrode assembly according to a third embodiment of the present invention.

Now referring to FIG. 5, where the peripheral region 20 of the electrodes 6, 8 surrounds the central region 18, the condensed flux of gases 29 that collects in the peripheral region 20 migrates toward the central region 18. When the condensed flux of oxygen 29 contacts the electrochemically active area, the production of $H_2O_2$ occurs. The degradation of the membrane 4, therefore, typically occurs at the edges of the anode and cathode electrodes 6 and 8, and more particularly, at the edges of the central region 18.

To suppress and eliminate the production of $H_2O_2$, the peripheral region 20 of the electrodes 6 and 8 may be formed with an electrically non-conductive support for the electrochemically active material instead of carbon. By using an electrically non-conductive support, the conductive pathway of electrons needed to complete the reaction of oxygen and hydrogen is eliminated. As such, the reaction that produces the $H_2O_2$ cannot occur. Examples of non-conductive support particles that may be used, but should not be limited to, are zirconium oxide, zeolites, titanium oxide, aluminum oxide, and fumed silica. A preferable electrically non-conductive support is fumed silica.

It should be understood, however, that any electrically non-conductive support may be used so long as the mechanical properties are uniform along the membrane surface and can withstand the harsh fuel cell environment. That is, the support particles should be inert to the acidic and high temperature environment. Further, the particle size of the electrically non-conductive support should be preferably less than 10 µm, more preferably less than 1 µm, and most preferably in the range of 20-30 nm.

It should also be understood that it is preferable to utilize non-conductive support particles that are catalyzed with a platinum group metal such as platinum, palladium, rhodium, ruthenium, iridium, osmium and alloys thereof. In addition to the above catalysts, any additional catalysts known in the art may be utilized as long as the catalyst is a low temperature hydrogen/oxygen gas phase recombination catalyst. That is, the catalyst should be active towards hydrogen and oxygen at temperatures less than 100° C. and stable in the acidic and humid fuel cell environment. A preferable loading concentration for the catalyst on the electrically non-conductive support particles is less than 5% and more preferably in the range of 1-5%.

Moreover, it should be understood that the anode electrode 6 and cathode electrode 8 will still exist as a smooth, continuous layer so that the ionically conductive member 4 faces an electrode layer 6 and 8 having essentially uniform mechanical properties throughout its entire surface which will protect the ionically conductive member 4 from stress, over-compression, and puncture. Further, it should also be understood that the gradient will also exist between the central region 18 and the peripheral region 20 such that the content of catalyst gradually moves from a greater content in the central region 18 to lesser content in the peripheral region 20. This gradient will exist over the course of, for example, 1 mm.

Yet another solution to this problematic formation of $H_2O_2$ is to use a binder in the peripheral region 20 that is an ionically non-conductive binder. In this manner, the proton conductive pathway is eliminated. An example of such a binder is a thermoplastic resin such as PBI. Other binders may be suitable and are contemplated as long as they maintain good adhesion with the ionomeric membrane 4, are chemically stable in the fuel cell environment (i.e., an acidic environment, at anodic potentials (0V vs. RHE) in the presence of $H_2$, at cathodic potentials (1.2V vs. RHE) in the presence of air or $O_2$, and traces of fluoride), thermally stable up to 150° C., and preferably up to 200° C., are preferably castable from solutions, and maintain good retention of their mechanical properties after the casted films endure temperature excursions up to 150° C.

Still another solution to the production of $H_2O_2$ is to use both of the above solutions simultaneously. More particularly, it is may be desirable to disperse the electrically non-conductive support particle, with the gas phase recombination catalyst, in the ionically non-conductive binder. In this manner, the conductive pathways for both the electrons and protons needed to complete the reaction to form $H_2O_2$ are eliminated. Moreover, although it is most preferable to modify both the anode and cathode electrodes 6 and 8 according to one of the three above solutions, the present invention should not be limited thereto. That is, either the anode 6 or cathode 8 may be modified singularly to include the electrically non-conductive support, ionically non-conductive binder, or both. Further, it is not out of the scope of the present invention for the cathode electrode 8 to include the electrically non-conductive support and the anode electrode 6 to include the ionically non-conductive binder, or vice-versa.

In each of the above embodiments, the central region 18 and peripheral region 20 may be catalyzed with finely divided catalytic particles so that the weight ratio of catalytic particles to carbon or graphite particles of the peripheral region 20 is less than that of the central region 18. It is evident that where the peripheral region 20 does not contain any catalyst particles and the central region 18 is catalyzed, this condition will be met. In the embodiment where catalytic particles are included in both regions, it is preferable that the weight ratio of catalytic particles to carbon particles in the central region 18 is greater than that of the peripheral region 20.

A method of preparing a MEA 2 according to the present invention will now be described. In order to prepare the anode 6, cathode 8, and active layers of the diffusion media, catalyzed carbon particles are prepared and then combined with the ionomer binder in solution with a casting solvent. Preferably, the anode 6, cathode 8, and active layers comprise ⅓ carbon or graphite, ⅓ ionomer, and ⅓ catalyst. Preferable casting solvents are aqueous or alcoholic in nature, but solvents such as dimethylacetic acid (DMAc) or trifluoroacetic acid (TFA) also may be used.

The casting solution is applied to a sheet suitable for use in a decal method, preferably the sheet is a Teflonated sheet. The sheet is subsequently hot-pressed to an ionically conductive member 4 such as a PEM. The sheet is then peeled off and the catalyst coated carbon or graphite remains embedded as a continuous electrode 6 or 8. The casting layer is applied directly to the diffusion medium to create the active layer 13.

In order to prepare a central region 18 and a peripheral region 20, two casting solutions may be employed. More particularly, a first casting solution is applied to the sheet suitable for a decal method to form the central region 18. The first casting solution has a predetermined content of catalytic particles contained therein. A second casting solution is then applied to the sheet to peripherally frame the central region 18 as a peripheral region 20. The second casting solution also has a predetermined content of catalytic particles. The second casting solution may have a content of catalytic particles less than the first casting solution, or it may contain no catalyst at all. The sheet is then subsequently hot-pressed to an ionically conductive member 4 and then peeled off to leave the central region 18 and peripheral regions 20 embedded on the ionically conductive member.

The second casting solution is applied directly after the first casting solution has been applied such that the first casting solution has not completely dried or solidified. Applying the casting solutions in such a manner will ensure that smooth, continuous layer will be formed so that there is no discontinuity in the electrodes 6 and 8, or active layer. Furthermore, applying the casting solutions in such a manner will allow the gradient to form between the central region 18 and the peripheral region 20. In a variation of the above method, it may be preferable to apply the first and second casting solutions essentially simultaneously.

With respect to a method of preparing an MEA with the intermediate layer disposed between the active layer and the diffusion medium, the present invention should not be limited to a particular method. For example, the intermediate layer may be painted or sprayed onto the diffusion medium and allowed to fill the porous regions of the diffusion medium at its surface.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly for a fuel cell comprising:
an ionically conductive membrane having a major surface;
an electrically conductive member facing said membrane major surface and having an active layer, said active layer having an active layer catalyst content; and
an electrode between said ionically conductive membrane and said electrically conductive member, said electrode having a major surface at said membrane major surface, and said electrode having an electrode catalyst content,
wherein said electrode has a peripheral extent substantially the same as the membrane and wherein said electrode further comprises a central region and a peripheral region, said central region having a first group of catalyzed particles dispersed in a binder, said peripheral region having a second group of particles dispersed in a binder that are catalyzed or uncatalyzed, said peripheral region overlapping a peripheral extent of said active layer, and said central region being within said peripheral extent of said active layer;
wherein said peripheral region is electrically non-conductive.

2. An assembly for a fuel cell comprising:
an ionically conductive membrane having a major surface;
an electrically conductive member facing said membrane major surface and having an active layer, said active layer having an active layer catalyst content; and
an electrode between said ionically conductive membrane and said electrically conductive member, said electrode having a major surface at said membrane major surface, and said electrode having an electrode catalyst content,
wherein said electrode has a peripheral extent substantially the same as the membrane and wherein said electrode further comprises a central region and a peripheral region, said central region having a first group of catalyzed particles dispersed in a binder, said peripheral region having a second group of particles dispersed in a binder that are catalyzed or uncatalyzed, said peripheral region overlapping a peripheral extent of said active layer, and said central region being within said peripheral extent of said active layer;
wherein the first group of particles is dispersed in an ionically conductive binder, and said second group of particles is dispersed in an ionically non-conductive binder.

3. A membrane electrode assembly comprising:
an ionically conductive membrane having a major surface;
an electrode at said major surface, said electrode defining a continuous layer supporting said membrane; and
an electrically conductive member adjacent said electrode and including an active layer;
wherein at least one of said electrode and said active layer comprise a central region and a peripheral region;
a gradient of electrochemically active material exists between said central region and said peripheral region such that a content of said electrochemically active material is greater in said central region than said peripheral region,
wherein said peripheral region is separate and distinct from a sealing member.

4. The membrane electrode assembly according to claim 3, wherein said central region includes a first group of particles that are electrically conductive, and said peripheral region includes a second group of particles that are electrically non-conductive.

5. The membrane electrode assembly according to claim 3, wherein said electrode provides structural support to said membrane and thereby restricts movement of said membrane.

6. The assembly according to claim 3, wherein said central region comprises an ionically conductive binder retaining electrically conductive particles and an active material.

7. The assembly according to claim 3, wherein said peripheral region comprises an ionically non-conductive binder retaining said electrically non-conductive particles and said active material.

8. The assembly according to claim 3, wherein said peripheral region further comprises thermally conductive material.

9. The assembly according to claim 7, wherein said ionically non-conductive binder is a thermoplastic resin.

10. The assembly according to claim 3, wherein said electrode and said active layer further comprise a first catalyst content and a second catalyst content, respectively; and
said first catalyst content includes 50% of the total catalyst content of the assembly, and said second catalyst content includes 50% of the total catalyst content of the assembly.

11. The assembly according to claim 3, wherein said electrically conductive member further comprises an intermediate layer comprising carbon particles dispersed in a binder that couples said active layer and said electrically conductive member.

12. The assembly according to claim 11, wherein said intermediate layer is a water management layer.

* * * * *